United States Patent [19]

Williams, III et al.

[11] 3,998,840

[45] Dec. 21, 1976

[54] METHOD FOR MAKING POLYETHERIMIDES USING A SODIUM CHLORIDE OR FERRIC SULFATE CATALYST

[75] Inventors: Frank J. Williams, III, Scotia; Howard J. Klopfer, Elnora, both of N.Y.

[73] Assignee: General Electric Company, Schenectady, N.Y.

[22] Filed: Apr. 16, 1976

[21] Appl. No.: 677,773

[52] U.S. Cl. .................... 260/326 N; 260/46.5 E; 260/47 CZ; 260/47 CP; 260/49; 260/78 TF; 260/326 S
[51] Int. Cl.$^2$ .............. C07D 209/48; C08G 20/32; C08F 11/04
[58] Field of Search ....... 260/326 N, 326 S, 47 CP, 260/47 CZ, 49, 78 TF, 46.5 E

[56] References Cited

UNITED STATES PATENTS

| | | | |
|---|---|---|---|
| 3,803,085 | 4/1974 | Takekoshi et al. | 260/78 TF |
| 3,847,870 | 11/1974 | Takekashi | 260/78 TF |
| 3,850,885 | 11/1974 | Takekoshi et al. | 260/78 TF |
| 3,948,941 | 4/1976 | Patton | 260/78 TF |

Primary Examiner—Lewis Gotts
Assistant Examiner—S. P. Williams
Attorney, Agent, or Firm—William A. Teoli; Joseph T. Cohen; Jerome C. Squillaro

[57] ABSTRACT

A method is provided for enhancing the rate of formation of polyetherimides by using either a sodium chloride catalyst, or ferric sulfate catalyst in a mixture of an aromatic bis(ether anhydride) and an organic diamine under melt polymerization conditions.

7 Claims, No Drawings

METHOD FOR MAKING POLYETHERIMIDES USING A SODIUM CHLORIDE OR FERRIC SULFATE CATALYST

The present invention relates to a method for making polyetherimides by effecting reaction between an aromatic bis (ether anhydride) and an organic diamine under melt polymerization conditions. More particularly, the present invention relates to the use of catalytic amounts of sodium chloride or ferric sulfate to enhance the rate of formation of polyetherimides.

In Takekoshi et al, Pat. No. 3,803,085, assigned to the same assignee as the present invention, there is described a method for making polyetherimides by melt polymerizing a mixture of certain aromatic bis(ether anhydrides) and organic diamines. For example, an aromatic bis(ether anhydride) of the formula (1) 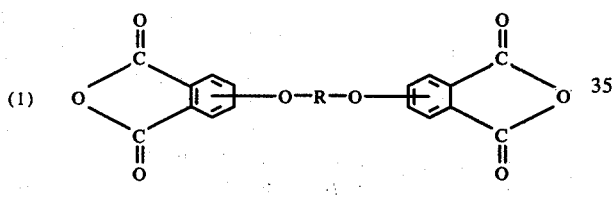

and organic diamine of the formula,
$$H_2NR^1NH_2 \qquad (2)$$

is melt polymerized at temperatures up to 350° C, where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chlorophenylene, naphthalene, etc., and radicals included by the formula $$-R^2-(Q)_a-R^2-$$

where $R^2$ is a divalent aromatic radical having 6–13 carbon atoms selected from hydrocarbon radicals and halogenated hydrocarbon radicals, and Q is a divalent organo radical selected from

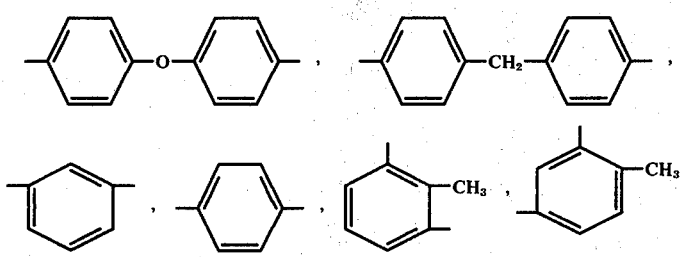

where $a$ is 0 or 1, $y$ is an interger having a value of from 1–5 inclusive, and $R^3$ is a monovalent hydrocarbon radical selected from methyl, phenyl, etc.

Radicals included by $R^1$ are, for example,

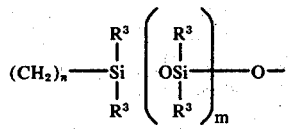

etc.; alkylene radicals such as hexamethylene, etc., cyclohexylene, etc.

$$(CH_2)_n-\underset{\underset{R^3}{|}}{\overset{\overset{R^3}{|}}{Si}}-\left(O\underset{\underset{R^3}{|}}{\overset{\overset{R^3}{|}}{Si}}\right)_m-O-$$

where R is as defined above, m is equal to 0 to 100 inclusive and n is 2–8 inclusive.

The above described melt polymerization method is a valuable procedure for making a variety of polyetherimides. Methods are constantly being sought, however, for accelerating the rate of melt polymerization of the mixture of aromatic bis(ether anhydride) and organic diamine while maintaining the valuable injection molding characteristics of the resulting polyetherimide.

The present invention is based on the discovery that catalytic amounts of either sodium chloride, or ferric sulfate, can be used in a melt polymerization mixture of the aromatic bis(ether anhydride) of formula (1) and organic diamine of formula (2) to substantially enhance the rate of polyetherimide formation from the resulting melt polymerization mixture without substantially imparing desirable characteristics of the resulting polyetherimide.

There is provided by the present invention a method for making polyetherimides consisting essentially of chemically combined units of the formula

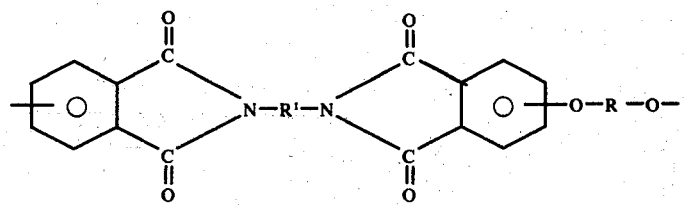

where R and R¹ are as previously defined, which comprises effecting the reaction under melt polymerization conditions between an aromatic bis(ether anhydride) of formula (1) and an organic diamine of formula (2) in the presence of a metal catalyst selected from the class consisting of sodium chloride and ferric sulfate.

Included by the aromatic bis(ether anhydride) of formula (1) which can be used in the practice of the invention and, for example,

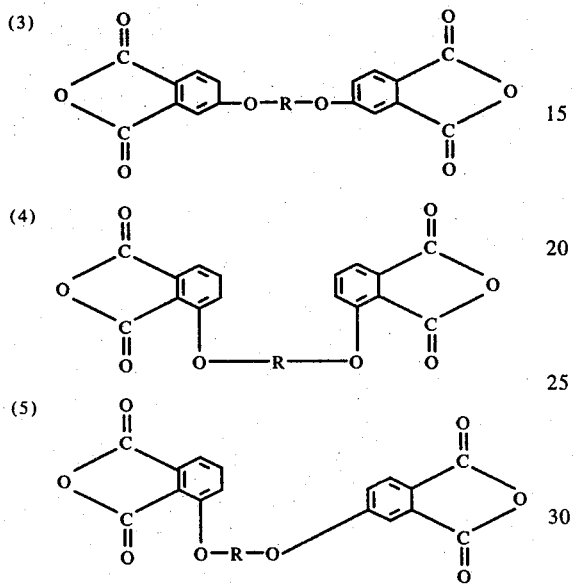

where R is as defined above.

Dianhydrides included by formula (3) are, for example,
2,2'-bis[4-(2,3-dicarboxyphenoxy)phenyl]-propane dianhydride;
4,4'-bis(2,2-dicarboxyphenoxy)diphenyl ether dianhydride;
1,3-bis(2,3-dicarboxyphenoxy)-benzene dianhydride;
4,4'-bis-(2,3-dicarboxyphenoxy)-diphenyl sulfide dianhydride;
1,4-bis(2,3-dicarboxyphenoxy)-benzene dianhydride;
4,4'-bis-(2,3-dicarboxyphenoxy)-diphenyl sulfone dianhydride;
etc.

Dianhydrides included by formulas (4) and (5) are, for example,
2,2-bis[4-(3,4-dicarboxyphenoxy)-phenyl]-propane dianhydride;
(3,4-dicarboxyphenoxy)-diphenyl ether dianhydride;
4,4'-bis(3,4-dicarboxyphenoxy)-diphenylsulfone dianhydride;
1,3-bis(3,4-dicarboxyphenoxy)-benzene dianhydride;
1,4-bis(3,4-dicarboxyphenoxy)-benzene dianhydride;
4,4₂-bis(3,4-dicarboxyphenoxy)-diphenylsulfone dianhydride;
4-(2,3-dicarboxyphenoxy)-4'-(3,4-dicarboxyphenoxy)-2,2-diphenyl propane dianhydride, etc.

Included by the organic diamines of formula (2) are, for example,
m-phenylenediamine;
p-phenylenediamine
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

In the practice of the invention, the aromatic bis (ether anhydride) and the organic diamine are blended thoroughly together with the metal salt catalyst which hereinafter will signify either sodium chloride, or ferric sulfate. In addition, aqueous solutions or suspensions of the catalyst can be used to insure that the catalyst is evenly distributed throughout the mixture of monomers. If desired, a chain stopper, such as phthalic anhydride, also can be used.

The blend can be heated to a temperature of from 200° to 400° C in a suitable agitator under an inert atmosphere to effect the formation of polyetherimide under melt polymerizing conditions. A nitrogen atmosphere can be employed. Suitable reactors for a batch process include, for example a Helicon mixer, a Brabender mixer, etc., while extruders can be used for a continuous process.

It has been found that if sodium chloride is used at a level of, for example, from 0.1 to 0.5% of the total weight of monomer used, or that ferric sulfate is used at a level of, for example, from 0.01 to 0.05%, based on total monomer weight, that the rate of polyetherimide formation is from two to four times faster than if no catalyst is used. This rate enhancement is seen in both continuous and batch melt polymerizations. The properties of the polyetherimides from the catalyzed reaction are substantially equal to those of polyetherimides prepared in uncatalyzed reactions.

Substantially equal molar amounts of aromatic bis (ether anhydride) and organic diamine can be used. Chain-stoppers, such as phthalic anhydride, can be used, for example from 1 mole percent to 5 mole percent, based on the total moles of aromatic bis(ether anhydride) used in the melt polymerization mixture.

In order that those skilled in the art will be better able to practice the invention, the following examples are given by way of illustration and not by way of limitation. All parts are by weight.

EXAMPLE 1

A mixture of 81.19 parts of 2,2-bis[4-(2,3-dicarboxyphenoxy)phenyl]propane dianhydride (BPA-dianhydride), 17.38 parts of metaphenylene diamine and 1.43 part of phthalic anhydride was added to an argon-blanketed Helicone mixer bowl. The mixture was converted to a melt at 500° F. The mixture was heated for a period of up to 60 minutes and samples were removed at 5 minute intervals starting after 10 minutes to determine the change, if any, of the I.V. in chloroform ($CHCl_3$). In addition, GPC scans were obtained at the 30 minute and 40 minute interval points to determine the ratio of the weight average molecular weight (Mw) to the number average molecular weight (Mn).

The above procedure was repeated except that there was employed 0.01 part of sodium chloride as a solution in 1.5 part of water which was added to the mixture prior to converting the mixture to a melt as described above. Again the intrinsic viscosity of the mixture was measured periodically.

Another melt polymerization was effected following the same procedure as above except that there was employed in the mixture prior to melt polymerization 0.025 to 0.5 part of sodium chloride in an aqueous solution.

The change in intrinsic viscosities IV over a period up to 60 minutes is shown below in Table I, where % Gel was determined in the polymer at the termination of the reaction by a procedure defined below, ment in polymerization rates in terms of I.V. over time was experienced with other sodium salts, such as sodium fluoride, sodium bromide, at equivalent weight percents, the increase in weight percent gel, such as 12% with sodium fluoride, eliminated such salts as potential catalysts. Although sodium sulfate did not result in excess gel formation, it failed to show any significant rate enhancement.

EXAMPLE 2

The above procedure was repeated, except that in place of sodium chloride there was used an aqueous suspension of ferric sulfate over a weight range of 0.01%, 0.025% and 0.05%, based on the weight of melt polymerization ingredients. As described in Example 1, the change in intrinsic viscosity and Gel % was measured over a period of 10 minutes, 15 minutes, 20 minutes, 25 minutes, etc. The results of the melt polymerization is shown below in Table II:

Table II

| Ferric Sulfate (WT%) | Change in I.V. over Time (Minutes) | | | | | | | | % Gel |
|---|---|---|---|---|---|---|---|---|---|
| | 10 | 15 | 20 | 25 | 30 | 35 | 40 | 45 | 60 | |
| 0 | | | .33 | | .43 | | | .46 | .48 | |
| 0.01 | .27 | .33 | .36 | .37 | | | .41 | | | 0 |
| 0.025 | .32 | .41 | .45 | .46 | | | .48 | | | 0.7 |
| .05 | .39 | .43 | | .47 | | | .48 | | | 3 |

EXAMPLE 3

A mixture of substantially equal molar amounts of 2,2-bis[4-(2,3-dicarboxyphenoxy)phenyl]propane dianhydride and meta phenylene diamine and 2.5 mole percent of phthalic anhydride, based on the total moles of reactants in the mixture, were charged to a Werner Pfleiderer ZDS-K28 twin screw extruder. After the mixture had been thoroughly blended, the mixture was continuously extruded at 350° C. There was obtained a polyetherimide having an intrinsic viscosity of about 0.44 with 9% by weight of gel.

The above procedure was repeated, except that there was utilized 0.1% by weight of sodium chloride in the mixture which was incorporated by means of an aqueous solution of the salt. Following the same conditions as previously described for the mixture free of sodium chloride, there was obtained a polyetherimide having an intrinsic viscosity of 0.55 with 4.2% by weight gel.

The above results demonstrate that, by using a metal salt catalyst in accordance with the method of the pre- Table I

| Sodium Chloride (WT%) | Change in IV Over Time (Minutes) | | | | | | | | | % Gel |
|---|---|---|---|---|---|---|---|---|---|---|
| | 10 | 15 | 20 | 25 | 35 | 40 | 45 | 55 | 60 | |
| 0 | .31 | .35 | .40 | .44 | | | | .49 | | 0 |
| 0.01 | .45 | .46 | .46 | .45 | .45 | | .47 | .45 | | |
| 0.025 | .44 | .43 | .44 | .41 | .43 | | .43 | .47 | | 0.5 |
| 0.05 | .46 | .46 | .44 | .43 | .45 | | .44 | .44 | | |
| 0.1 | | .41 | .46 | .46 | | .48 | | | | 0 |
| 0.5 | .42 | .45 | .46 | .45 | | | .47 | | | 1.6 |

Percent Gel in the polyetherimide was determined by heating 250 mg samples in a circulating air oven for 3 hours at 300° C. The samples were then weighed and placed in refluxing chloroform for 16 hours. The weight percent gel was then determined by weighing the residue. It also was found that although enhancesent invention under continuous polymerization conditions, higher molecular weight polyetherimide can be made in less time than if the polymerization is conducted in the absence of such catalyst.

Although the above examples are limited to only a few of the very many variables which can be employed in the practice of the method of the present invention, it should be understood that the method of the present invention is broadly directed to making polyetherimide by a melt polymerization technique utilizing aromatic bis(ether anhydride) of formula (1) and organic diamine of formula (2) under melt polymerization conditions in the presence of a metal salt catalyst as previously defined.

What we claim as new and desire to secure by Letters Patent of the United States is:

1. A method for making polyetherimides consisting essentially of chemically combined units of the formula

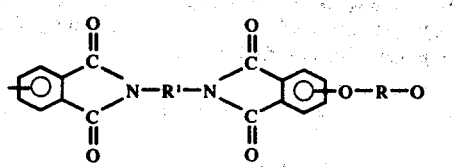

where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals, which comprises effecting the reaction under melt polymerization conditions between an aromatic bis(ether anhydride) of the formula

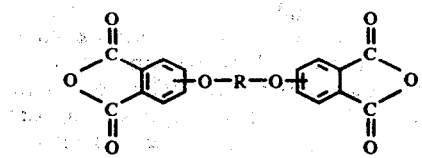

and an organic diamine of the formula

in the presence of a metal catalyst selected from the class consisting of sodium chloride and ferric sulfate.

2. A method in accordance with claim 1, where the aromatic bis(ether anhydride) is 2,2-bis[4-(2,3-dicarboxyphenoxy)phenyl]propane dianhydride.

3. A method in accordance with claim 1, where the organic diamine is meta phenylene diamine.

4. A method in accordance with claim 1, utilizing a phthalic anhydride as a chain stopper.

5. A method in accordance with claim 1, where the metal salt is sodium chloride.

6. A method in accordance with claim 1, where the metal salt is ferric sulfate.

7. A method in accordance with claim 1, where the reaction is effected in a continuous manner in an extruder.

* * * * *